United States Patent
Ma et al.

(10) Patent No.: US 10,082,130 B2
(45) Date of Patent: Sep. 25, 2018

(54) HEATING DEVICE FOR BEARING PROTECTION OF WIND POWER GENERATOR AND BEARING SYSTEM

(71) Applicant: BEIJING GOLDWIND SCIENCE & CREATION WINDPOWER EQUIPMENT CO., LTD., Beijing (CN)

(72) Inventors: Shengjun Ma, Beijing (CN); Chengqian Liu, Beijing (CN); Yongsheng Li, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/558,925

(22) PCT Filed: Nov. 17, 2015

(86) PCT No.: PCT/CN2015/094837
§ 371 (c)(1),
(2) Date: Sep. 15, 2017

(87) PCT Pub. No.: WO2016/169263
PCT Pub. Date: Oct. 27, 2016

(65) Prior Publication Data
US 2018/0073489 A1 Mar. 15, 2018

(30) Foreign Application Priority Data
Apr. 22, 2015 (CN) .......................... 2015 1 0193869

(51) Int. Cl.
*F16C 37/00* (2006.01)
*F03D 80/40* (2016.01)
*F03D 80/70* (2016.01)

(52) U.S. Cl.
CPC ............ *F03D 80/40* (2016.05); *F03D 80/70* (2016.05); *F16C 37/007* (2013.01);
(Continued)

(58) Field of Classification Search
CPC .... F16C 37/007; F16C 2360/31; F03D 80/60; F05B 2240/54; F05B 2240/60
See application file for complete search history.

(56) References Cited

U.S. PATENT DOCUMENTS 9,284,949 B2 * 3/2016 Pick .................... F03D 11/0008
9,531,245 B2 12/2016 Eriksen et al.
(Continued)

FOREIGN PATENT DOCUMENTS

| CN | 101696677 A | 4/2010 |
| CN | 201925703 U | 8/2011 |

(Continued)

OTHER PUBLICATIONS

International Search Report issued by the State Intellectual Property Office of People's Republic of China for International Application No. PCT/CN2015/094837, dated Feb. 24, 2016.
(Continued)

*Primary Examiner* — Thomas R Hannon
(74) *Attorney, Agent, or Firm* — Finnegan, Henderson, Farabow, Garrett & Dunner, LLP

(57) ABSTRACT

A heating device for protecting a bearing of a wind power generator and a bearing system, wherein the heating device is applied to a main shaft of the wind power generator that is externally provided with a bearing, and the heating device is disposed inside the main shaft at a position corresponding to the position of the bearing. The heating device includes multiple circular arc sections, a flexible heat source and a supporting device. The flexible heat source is provided between the circular arc sections and an inner wall of the
(Continued)

main shaft. The supporting device supports the internal surface of the circular arc sections, so that the flexible heat source is closely adhered to the inner wall of the main shaft. A heat source is provided for the bearing by the heating device for bearing protection of a wind power generator and the bearing system.

16 Claims, 3 Drawing Sheets

(52) U.S. Cl.
CPC ....... *F05B 2240/54* (2013.01); *F05B 2240/60* (2013.01); *F16C 2360/31* (2013.01)

(56) References Cited

U.S. PATENT DOCUMENTS

| | | |
|---|---|---|
| 2010/0135793 A1 | 6/2010 | Krauss |
| 2011/0148119 A1 | 6/2011 | Fischer et al. |
| 2011/0204633 A1 | 8/2011 | Takayanagi |
| 2012/0256426 A1* | 10/2012 | Klein ............... F03D 80/70 290/1 C |
| 2012/0282096 A1 | 11/2012 | Eriksen et al. |
| 2015/0211572 A1* | 7/2015 | Casazza ............... F03D 7/00 290/44 |
| 2016/0037583 A1 | 2/2016 | Stortz et al. |

FOREIGN PATENT DOCUMENTS

| | | |
|---|---|---|
| CN | 102439300 A | 5/2012 |
| CN | 102767479 A | 11/2012 |
| CN | 103084783 A | 5/2013 |
| CN | 104832774 A | 8/2015 |
| CN | 204611307 U | 9/2015 |
| DE | 202014103596 U1 | 8/2014 |
| WO | WO 2014/024139 A1 | 2/2014 |

OTHER PUBLICATIONS

Extended European Search Report issued by European Patent Office for the counterpart European Patent Application No. 15889746.2, dated Apr. 11, 2018.

* cited by examiner

HEATING DEVICE FOR BEARING PROTECTION OF WIND POWER GENERATOR AND BEARING SYSTEM

This application is a National Phase entry of PCT Application No. PCT/CN2015/094837, filed Nov. 17, 2015, which claims the priorities to Chinese Patent Application No. 201510193869.7, titled "HEATING DEVICE FOR BEARING PROTECTION OF WIND POWER GENERATOR AND BEARING SYSTEM", filed with the Chinese State Intellectual Property Office on Apr. 22, 2015, the entire disclosures of which are incorporated herein by reference.

FIELD

This application relates to a heating device for protecting a bearing of a wind power generator and a bearing system, and pertains to the technical field of wind power generation.

BACKGROUND

In a shaft system of a permanent-magnet direct-drive outer rotor wind power generator, a bearing is generally provided between a main shaft of a stator and a rotatable shaft of a rotor, and bearing lubricating grease is applied to the bearing.

1. Movement of the Lubrication Grease in the Bearing

With the rotation of a bearing, the movement of the lubrication grease filled in a rolling bearing may be substantially divided into two stages. In general, the amount of lubrication grease filled in the bearing always exceeds the actual required amount of lubrication grease directly participating the rotation of the bearing. At an early operation stage of the rolling bearing, most of the lubrication grease is quickly (less than 1 min) extruded out of a raceway, and the extruded grease accumulates on a cage and in a cavity of the bearing cover and forms a contour outside rollers. In this process, the temperature of the bearing rises rapidly due to the resistance of excess lubrication grease. Most of the excess lubrication grease is extruded out at a beginning stage of the operation, and the extruded lubrication grease near the raceway is likely to be brought into the raceway by the rollers. This lubrication grease is discharged successively little by little as the rollers of the bearing rotate in a cycling manner. At this time, the temperature of the bearing is continuously rising, which is called a running-in stage of the lubrication grease. The running-in stage may last a dozen minutes or even several hours depending on many factors such as the quality and amount of lubrication grease filled in the bearing. When the excess lubrication grease is completely discharged, a small amount of remaining lubrication grease forms thin lubrication grease films on contact surfaces between the rollers, the raceway and the cage by a wedge effect, thus entering a normal operation stage of the bearing. At this time, the temperature of the bearing gradually decreases and reaches a balance state. In other words, a long-term lubrication is mainly functioned by these lubrication films. In addition, during the long-term operation of the bearing, the lubrication grease on the rollers, on the contour near the raceway, and on the cage will be reduced and a part of base oil is formed. When the base oil enters into the raceway, it also assists the lubrication. The capabilities of different greases in the bearing are different in forming contours, and the ideal grease may form a relatively upright contour, and has a running-in stage of short time, and ensure a low temperature and a smooth operation of the bearing in a long-term operation. The capability of forming a channel shape of the lubrication grease is very important, and only the "fluidized" lubrication grease can be ensured to form the channel shape. When the lubrication grease is frozen, or close to the frozen state, the lubrication grease will be accumulated, agglomerated, losing a proper lubrication effect as it should have. The service life of the bearing of the main shaft of direct-drive outer rotor wind power generator may affect the service life of the entire generator. Replacement of the lubrication grease and cleaning the bearing are difficult. In the limit space of partial surrounding area near the bearing, the air temperature of the working environment varies from −45 Celsius degrees to +65 Celsius degrees. Since the lubrication grease may have a low mobility in a low temperature condition, the lubrication grease extruded out of the bearing will hardly return to the raceway.

2. The Analysis of Slip Reasons of the Rolling Bearing

The bearing is coupled to the shall by an interference fit. According to incomplete statistics, coupling failure caused by relative rotation between the shaft and an bearing inner ring accounts for 30% of failure reasons of the shaft type drive parts. In the case that relative rotation presents between the shaft and the bearing inner ring, the journal rubs against the bearing inner ring, causing the size of the journal to be smaller than the size of the inner ring, so that the interference is "lost". The journal mounting surface is damaged and the inner ring is scrapped.

In the case that the lubrication grease of the rolling bearing is frozen or is no longer "fluidized", the friction between the inner ring and the rollers cannot overcome the resistance during starting and is apt to cause the slipping of the rollers and their cage as a whole for the significantly increased resistance caused by the state of the lubrication grease between the cage and the rollers. In the case that the lubricant is frozen or is no longer "fluidized", the main reasons for the slipping of the rollers in a bearing area are as follows: ① the rollers just enters the bearing area, the lubrication grease is frozen, causing the friction coefficient to be smaller; ② the lubrication grease is frozen, causing the rollers to be carried on the cage and further form one piece together with the cage, further resulting in significantly increased resistance; ③ a gust of wind comes in a low temperature period of time, and a wind power generator starts quickly, causing too fast variation of the bearing speed, further causing slipping.

When the generator is used in cold winter areas, the bearing lubricating grease between the stator main shaft and the rotatable shaft of the rotor is prone to be frozen after the generator is shut down. In the case that the lubrication grease is frozen or no longer fluidized, force start will cause the slipping of the bearing rollers on the raceway surface when wind comes from the wind field, which makes the rolling friction between the raceway and the rollers turn into sliding friction, and the rollers continue to slip, resulting in deformation of the rollers. In the case that the rollers and the cage are frozen integrally, and the generator is forcibly started when wind comes front the wind field, the rollers and the cage slip integrally, thus the cage may be damaged. Multiple times of continuous such action may cause bearing failure.

SUMMARY

The embodiment of the present application provides a heating device for protecting a bearing of a wind power generator and a bearing system, so as to provide a heat source for maintaining the fluidization of the bearing lubricating grease and extending the service life of the bearing.

In order to achieve the above object, a heating device for protecting a bearing of a wind power generator is provided according to an embodiment of the present application, which is applied to a main shaft of a wind power generator with a bearing sleeved on the main shaft. The heating device is arranged inside the main shaft and corresponding to the bearing in position, and the heating device includes: multiple circular arc sections, a flexible heat source arranged between an inner wall of the main shaft and the multiple circular arc sections, and a support device configured to support inner surfaces of the multiple circular arc sections for closely fitting the flexible heat source against the inner wall of the main shaft.

A bearing system of a wind power generator is further provided according to an embodiment of the present application, which includes: a main shaft of the wind power generator, and a blade side bearing and a tower side bearing sleeved on the main shaft. The heating device for protecting a bearing of the wind power generator as described above is provided inside the main shaft at a position corresponding to the blade side bearing and/or the tower side bearing.

In the heating device for protecting the bearing of the wind power generator and the bearing system according to embodiments of the present application, the flexible heat source is brought into close contact with an inner wall of the fixed shaft by the combination of the support device and the multiple circular arc sections, thus, the necessary condition of the heat conduction mode is achieved. Moreover, the heat source is fixed onto the inner wall of the main shaft of the wind power generator, so as to provide a heat source for the bearing, such that the bearing lubricating grease will not be frozen and can be maintained in a fluidized state, thus the service life of the bearing is prolonged, and close contact of the flexible heat source with the inner wall of the main shaft of the wind power generator is achieved.

REFERENCE NUMERALS IN THE DRAWINGS

Figure 1:
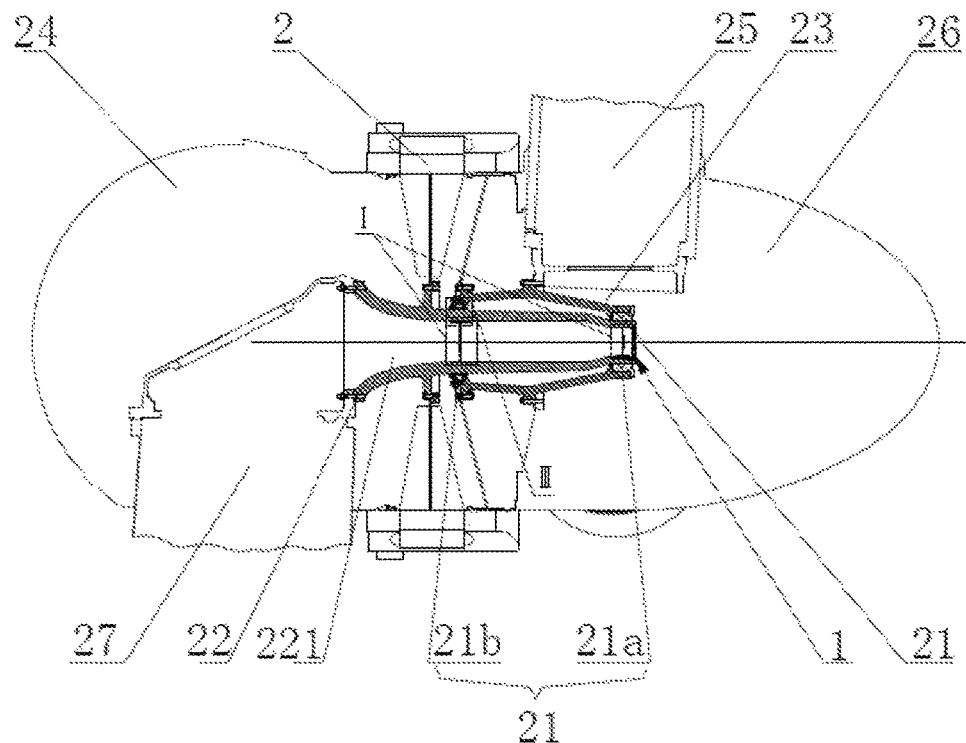
FIG. 1 is a schematic view showing the mounting structure of a heating device according to an embodiment of the present application mounted in a wind power generator.

| 1   | heating device,                         | 11  | circular arc section,         |
|-----|-----------------------------------------|-----|-------------------------------|
| 111 | abutting arc section,                   | 12  | flexible heat source,         |
| 121 | flame retardant flexible electric heat source layer, |     |                               |
| 122 | electrically insulating elastic layer,  |     |                               |
| 13  | support device,                         | 131 | left-spiral support bar,      |
| 132 | right-spiral support bar,               | 133 | bi-directional-spiral sleeve, |
| 134 | force applying bar,                     | 2   | wind power generator,         |
| 21  | bearing,                                | 21a | blade side bearing,           |
| 21b | tower side bearing,                     | 211 | bearing outer ring,           |
| 212 | bearing inner ring,                     | 213 | roller,                       |
| 22  | fixed shaft,                            | 221 | fixed shaft inner cavity,     |
| 23  | rotatable shaft,                        | 24  | nacelle,                      |
| 25  | impeller,                               | 26  | air deflector,                |
| 27  | tower.                                  |     |                               |

DETAILED DESCRIPTION

The heating device for protecting a bearing of a wind power generator according to embodiments of the present application are described in detail hereinafter with reference to the drawings.

A bearing is provided between a main shaft of a stator and a rotatable shaft of a rotor in a shaft system of a permanent-magnet direct-drive outer rotor wind power generator. In a cold area in winter, bearing lubricating grease in the bearing will be frozen after the generator is shut down. When the bearing lubricating grease is frozen, force start of the generator will, in one aspect, cause bearing rollers to instantaneously slip on a bearing raceway surface, which may turn rolling friction between the bearing raceway and the bearing rollers into sliding friction, and if the slipping keeps happening, the bearing rollers may be deformed. In another aspect, when the bearing lubricating grease is frozen, the bearing rollers and the bearing cage may be frozen into one piece, and force start will cause the bearing rollers and the bearing cage to slide integrally, and then the cage is damaged, and multiple times of such continuous actions may cause bearing failure.

In order to prolong the service life of the bearing, it is necessary to preheat and defrost the bearing lubricating grease before the start of the wind power generator (or to maintain the fluidized state of the bearing lubricating grease), a flexible heat source is mounted on the shaft of the permanent-magnet direct-drive outer rotor wind power generator (in the natural environment outside of a nacelle) after the generator has already been put into operation, so as to address the freezing issue of the bearing lubricating grease in the extremely cold period (also called the "third nine days", the "fourth nine days") after the solar term of "winter solstice". The design of the flexible heat source, the fixed position of the flexible heat source, and the supporting device for the flexible heat source are presently to be addressed.

Before introducing the principle of the embodiments of the present application, the application background and the installation of the flexible heat source are briefly described.

1. The Flexible Heat Source and Current Situation of Application Thereof

At present, the flexible heat source is commonly a silicone rubber heating pad. According to different habits, the silicone rubber heating pad is also called as a silicone rubber heating sheet, a silicone rubber heating plate, a silicone rubber electric heating sheet, a silicone rubber electric heating plate, a silicone rubber electric heating film, a polyimide electric heating film, a transparent PET electric heating film, a waterproof electric heater, a silicon rubber heater, a silicon rubber heating element, etc. A silicone rubber heating pad with temperature control and a silicone rubber heating pad without temperature control are further included.

A silicone rubber heating pad is a sheet of generating heat immediately when being supplied with power. The core of silicone rubber heating pad employs a nickel chrome wire or a nickel chromium foil etched into a certain shape, which has high reliability. The method for producing a silicone rubber heating pad includes: etching a nickel chrome foil with a thickness of 0.02 mm to 0.1 mm into a certain shape, coating thermal insulation materials on two sides of the nickel chrome foil, and performing high temperature molding and aging heat treatment to the nickel chrome foil. The silicone rubber heating pad is a red, or other color, soft sheet which can closely fit to various curved surfaces. The silicone rubber heating pad can be produced depending on various shapes and powers. The features of the silicone rubber heating pad include: generating heat rapidly, heating immediately after being energized, with a power per unit area of 8 w/cm$^2$. The silicone rubber heating pad has a small heat capacity, thus, and the silicone rubber heating pad can be turned on and off quickly as a heat source and has high thermal efficiency. In the case of heating a liquid, the temperature of heating film itself is only a few decades of degrees higher than the temperature of the liquid, which can save energy by two to three times compared with an ordinary electric furnace. The silicone rubber heating pad is water resistant, acid resistant, alkali resistant, and has a high electrical insulation strength. The silicone rubber heating pad has a high mechanical strength: mechanical pressure 200 kg/cm$^2$. The silicone rubber heating pad has a small volume, and nearly occupies no space in use. Using the silicone rubber heating pad is also convenient, and because the silicone rubber heating pad itself is insulated, no naked light will be generated, and the process upon thermal insulation is greatly simplified. The silicone rubber heating pad has a wide range of heat resistance: from −60 Celsius degrees to 250 Celsius degrees. The silicone rubber heating pad has a long service life, and can be used nearly permanently under normal working conditions. The nickel chromium foil can resist any corrosion, and the silicone rubber heating pad has a surface resistance up to 200 kg/cm$^2$. Also, the silicone rubber heating pad has options in size, hardness and thickness.

In the aspect of the structure, the silicone rubber heating pad consists of a silicone gel-glass fiber cloth made by pressing two glass fiber cloths and double sheets of press silicone gel. The silicone rubber heating pad as a sheet product (with a standard thickness of 1.5 mm) has a good softness, and can completely closely fit the object to be heated. The silicone rubber heating pad can be easily fit the subject to be heated for the softness, thus, the shape can be designed according to actual requirements. In this way, the silicone rubber heating pad can transfer heat to any desired place. The silicone rubber heating pad includes arranged nickel alloy resistance wires and therefore is safe and reliable. The products are widely used in the antifreeze, thermal insulation and heating field such as tubular or planar parts in health care, instrumentation, mechanical equipment and the like. Silicone rubber is a new type of polymer elastomer, which has excellent performances in resisting high and low temperatures, has excellent resilience performance and small permanent deformation performance. In terms of electrical performance, even in the case of short circuit, the generated silica is an insulator. In terms of surface property, the silicone rubber will not adhere to many other materials.

2. Difficulties in Mounting the Flexible Heat Source at the Wind Farm

A considerable number of direct-drive outer rotor wind power generators which have been put into operation and will be put into operation in the wind farms in northeast, northwest, Tibet regions, are located in the cold natural environment, and the direct-drive outer rotor wind power generators have no bearing lubricating grease antifreeze measures in their shaft systems when being designed. Thus, it is required to additionally provide an electric heating apparatus subsequently, and determine the type and the fixing mode of the electric heating apparatus. Anti-corrosion measures have been applied on the surface of cavity of a stator main shaft. The channel in the cavity of the stator main shaft of the wind power generator is required to be employed, which is also the only channel for power lines, data communication lines in the nacelle entering a hub of the wind power generator. Thus, this channel needs to remain unblocked and has no risk of fire at all.

The method of setting a heating apparatus such as an air heater in the cavity of the stator main shaft of the wind power generator is not energy-saving. In the method that the flexible heat source is adhered on the inner wall of the cavity of the stator main shaft, there may be risks such as the temperature runaway, firing etc., since the flexible heat source is in a long-term forced vibration state. There are temperature change ranging from −45 Celsius degrees to +60 Celsius degrees in the cavity of the stator main shaft of the wind power generator, thus long-term vibration and temperature alternating effect will cause adhesive failure. In addition, even if the flexible heat source is adhered on the wall surface of the inner cavity, the other side of the flexible heat source will radiate heat to the inner cavity, therefore, there is a need to add a heat insulation layer, however, this increases the weight of flexible heat source, causing the flexible heat source to fall off more easily. While fixing the flexible heat source, it further needs to maintain the unblocking of the inner cavity of the stator main shaft of the wind power generator, and the energy-efficiency requirement of heating requires the flexible heat source and the surface of the cavity of the stator main shaft of the wind power generator to achieve "close contact". If the "close contact" cannot be achieved, the flexible heat source itself will be burned, failure, and even cause a fire. However, in the current electric heating apparatus industry, when employing the flexible heat source to heat, it further need to explore the cases of developing fixing tooling for using the flexible heat source in extreme natural environments. This is because the reliable fixing cannot be fixed reliably simply by the adhesive technology (adhering process). Even if the adhering process for the heat source is completed indoors before the wind power generator leaves factory, in the process of hundreds of kilometers of long-distance transport, the heat source and the insulation material is apt to fall off due to bumpy vibrations. If the heater source or the insulation material falls off, it can hardly to carry out the adhering process on site in winter, and the low temperature may cause failure of the adhesive or degrade the adhesive performance. Even in summer, the adhering process can be carried on site, but it also needs to take measures for fixing the heat source and the insulation material, so as to prevent falling off. In another aspect, adhering is not the preferred way. This is because if the heat source is adhered to the inner wall of the stator main shaft of the wind power generator, it is bad for the thermal expansion and contraction of the heat source material, further, it will become a restrict. A shear stress may be generated on the adhering surface, which is apt to cause the original anti-corrosion layer to fall off from the wall surface of the inner cavity of the stator main shaft in the wind power generator and to be damaged, and so is case to the surface of the silicone rubber material of the heat source. The wind power generators are positioned in the unattended wild natural environment, and once the wind power generator is caught fire, it is hardly to carry out fire fighting, and the leeward grassland and the wind power generators may even suffer heavy losses due to fire disaster.

The technical principle of the embodiments of the present application is put forward based on the above situation: the flexible heat source is brought into close contact with the wall surface of the inner cavity of the fixed shaft of the wind power generator by the combination of the support device and multiple arc sections and is fixed on the inner wall of the main shaft of the wind power generator by means of the support device together with the heat insulating material to provide heat for the bearing, which addresses the freezing issue and maintains the fluidization of the bearing lubricating grease, prolongs the service life of the bearing, and achieves close contact between the flexible heat source and the inner wall of the main shaft of the wind power generator.

First Embodiment

Figure 2:
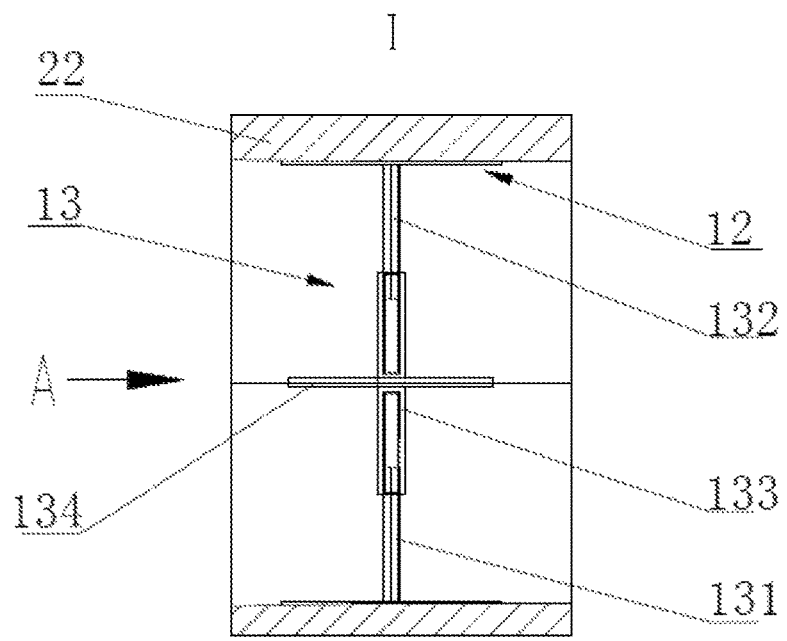
FIG. 2 is a partial enlarged view of the structure in FIG. 1 at a part I.
Figure 3:
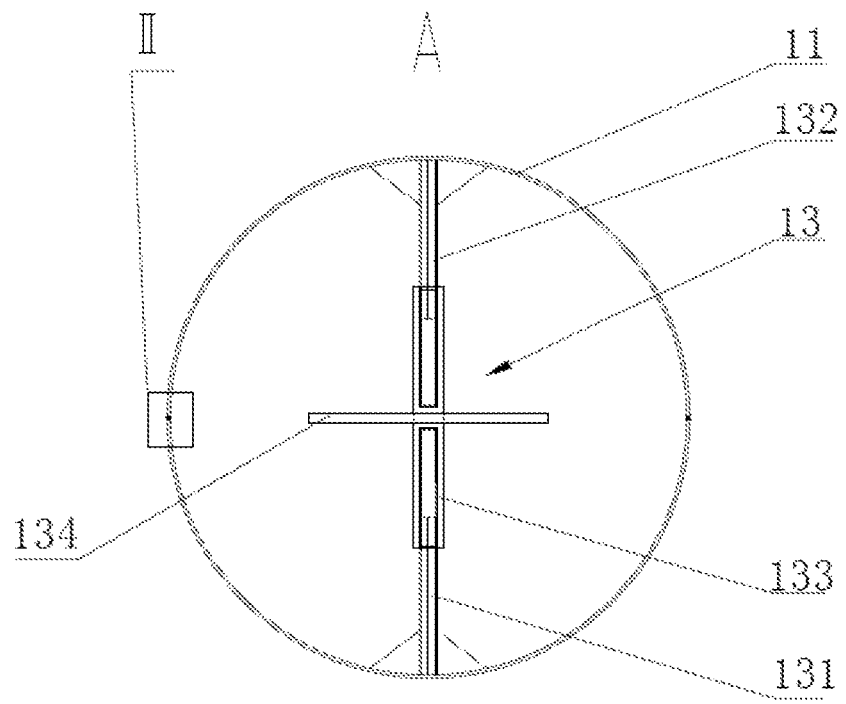
FIG. 3 is a front view of the structure in FIG. 2 at a part A.

As shown in FIGS. 1 to 3, FIG. 1 is a schematic view showing the mounting structure of a heating device according to an embodiment of the present application mounted in a wind power generator. FIG. 2 is partial enlarged view of the structure in FIG. 1 at a part I, and FIG. 3 is a front view of the structure in FIG. 2 at a part A.

In this embodiment of the present application, a heating device 1 for protecting a bearing of a wind power generator is provided, which can be applied to a main shaft, with a bearing sleeved thereon, of a wind power generator. The heating device 1 is arranged inside the main shaft, and heats the bearing sleeved on the main shaft through an inner wall of the main shaft. In the wind power generator, the stator and the rotor have their own main shafts. The main shaft of the stator is abbreviated as a fixed shaft, and the main shaft of the rotor is abbreviated as a rotatable shaft. Depending on different structures of the wind power generator, the position relationship between the rotatable shaft and the fixed shaft is also different. For a wind power generator having a structure with an inner stator and an outer rotor, the rotatable shaft is sleeved on the fixed shaft by means of a bearing. In this case, the main shaft described above is the fixed shaft of the wind power generator, namely, the heating device is arranged inside the fixed shaft. For a wind power generator having a structure with an outer stator and an inner rotor, the fixed shaft is sleeved on the rotatable shaft by means of a bearing. In this case, the main shaft described above is the rotatable shaft of the wind power generator, namely, the heating device is arranged inside the rotatable shaft. In general, two bearings are required to achieve the cooperation of the rotatable shaft and the fixed shaft. One of the two bearings is close to a tower side, and is referred to as a tower side bearing in the present application, and the other one is close to a blade side, and is referred to as a blade side bearing in the present application.

As an example of the present application, the wind power generator shown in FIG. 1 is a structure with an outer rotor and an inner stator. The heating device 1 is applied to the fixed shaft 22, and the rotatable shaft 23 is sleeved outside of the fixed shaft 22. The heating device 1 is arranged in the interior of the fixed shaft 22 at a position corresponding to the position of the bearing 21. The correspondence in position here means a condition which enables the heating device 1 to heat the bearing 21 through the shaft wall of the fixed shaft 22 form the interior of the fixed shaft 22, i.e. the heating device 1 should be located in the vicinity of the position where the bearing 21 is sleeved. In addition, in the structure shown in FIG. 1, the bearing 21 includes a blade side bearing 21a and a tower side bearing 21b. In practice application, generally, each of the positions corresponding to the blade side bearing 21a and the tower side bearing 21b is provided with the heating device 1, that is, two heating devices 1 are provided inside the fixed shaft 22. There may also be only one heating device 1 arranged at one of the positions according to practical requirements. Description is made hereinafter taking the case that the heating device 1 is provided at each of the positions corresponding to the blade side bearing 21a and the tower side bearing 21b as an example.

FIG. 1 further shows components such as a nacelle 24, a impeller 25, a air deflector 26, a tower 27, a fixed shaft 22, a fixed shaft inner cavity 221 and a rotatable shaft 23, so as to accurately describe the specific installation position of the heating device 1.

As a preparation work, a layer of thermal silicone grease (flame retardant silicone grease) with a thickness of 1mm to 2mm (+45 Celsius degrees to 80 Celsius degrees) is coated on the surface of the fixed shaft inner cavity 221 (or the surface of the rotatable shaft inner cavity) of a wind power generator 2. The upper temperature limit does not need to take the high temperature resisting requirements into consideration. In the process of construction on site in winter, an air blower apparatus such as a hot air gun is also needed. The surface of the inner cavity of the fixed shaft 22 is wiped to be clean, and is then dried by the air blower apparatus such as the hot air gun, and is then heated continuously by half an hour till reaching a room temperature ranging from 20 Celsius degrees to 30 Celsius degrees. Thus, heat in the fixed shaft 22 of the wind power generator is accumulated, thereby meeting the requirement of maintaining the thermal grease "fluidized" in the process of operation, and then the thermal grease is coated.

The heating device 1 may include multiple circular arc sections 11, a flexible heat source 12, and a support device 13. The flexible heat source 12 may be arranged between the inner wall of the fixed shaft 22 and the circular arc sections 11, and the support device 13 can support the inner surfaces of the circular arc sections 11 for closely fitting the flexible heat source 12 with the inner wall of the fixed shaft 22. Specifically, the positions of two heating devices 1 correspond to positions of the blade side bearing 21a and the tower side bearing 21b of the wind power generator 2 (as shown in FIG. 1, a left side is the tower side of the wind power generator 2 and a right side is the blade side of the wind power generator 2) respectively. The flexible heat source 12 is pressed between the inner wall of the fixed shaft 22 and the multiple circular arc sections 11 by the combination of the support device 13 and the multiple circular arc sections 11, so that the flexible heat source 12 is in "close contact" with the inner wall of the fixed shaft 22. Thus, the technical issue of close contact of the flexible heat source 12 with the inner wall of the fixed shaft 22 is addressed. The "close contact" is necessary for the flexible heat source 12 to heat a solid by conducting heat to the surface of the heated solid. The flexible heat source 12 provides a heat source for the bearing 21, thus the freezing issue of bearing lubricating grease is addressed and the service life of the bearing 21 is prolonged.

As shown in FIG. 3, which is a front view of the structure in FIG. 2 at a part A. In the above heating device, the circular arc sections 11 are of the same size and the number of the circular arc sections 11 is an even number, and each two circular arc sections 11 opposite in a radial direction of the fixed shaft 22 form a group. The circular arc sections 11 may be one or more groups, and preferably, these arc sections 11 can be spliced into a circular ring (a certain gap is allowed to present at the splicing portion between the circular arc sections), so that a circle of the inner wall of the fixed shaft 22 can be heated uniformly. The support device 13 includes multiple groups of left-spiral support rods 131, right-spiral support bars 132 and bi-directional-spiral sleeves 133 with the number of the groups the same as the number of the groups of the circular arc sections 11. Two ends of the bi-directional-spiral sleeve 133 may be connected to one end of the left-spiral support bar 131 and one end of the right-spiral support bar 132, respectively, and another end of the left-spiral support bar 131 and another end of the right-spiral support bar 132 may be supported in the middle of inner surfaces of two circular arc sections 11 in the same group, respectively. Specifically, each of the circular arc sections 11 is made of a rigid material and is preferably a semicircular arc section, such that a circular ring can be formed by just one group of arc sections and thus the whole circle of the inner wall of the fixed shaft 22 can be heated uniformly, and the circular arc section 11 may have a thickness ranging from 5 mm to 6 mm. In the inner cavity of the fixed shaft 22, the flexible heat source 12 is provided on an outer side of the above circular ring. By providing a combination of the support device 13 and the circular arc sections 11, the flexible heat source 12 can be forced to closely contact the inner wall of the fixed shaft. Such a structure can also simplify the assembly and disassembly process, so as to allow the tightness degree of the contact of the flexible heat source 12 with the inner wall of the fixed shaft 22 to be adjustable. In addition, the support device 13 is located in the center of a group of circular arc sections 11, and there is a gap presenting between the support device 13 and the group of circular arc sections 11, so that the cavity of the fixed shaft 22 is kept unblocked, and the combination of the support device 13 and the multiple circular arc sections 11 does not occupy the channel of the original power and communication cables. Works such as routine maintenance, inspection are facilitated.

Further, the two circular arc sections 11 (a group of arc sections 11) are connected to the two support bars (the left-spiral support bar 131 and the right-spiral support bar 132 connected to the same bi-directional-spiral sleeve 133) by welding to form one piece. A bi-directional-spiral sleeve 133 may be connected to the two support bars by trapezoidal screw threads (or serrated screw threads). A force applying bar 134 for rotating the bi-directional-spiral sleeve 133 may be provided in the middle of the bi-directional-spiral sleeve 133. The force applying bar 134 may be directly welded to a wall of the rotary bi-directional-spiral sleeve 133, or a pair of through holes may be formed in the wall of the rotary bi-directional-spiral sleeve 133, through which the force applying bar 134 passes. By rotating the force applying bar 134 and thus further rotating the bi-directional-spiral sleeve 133 and employing a "force transmission screw" structure between the bi-directional-spiral sleeve 133 and the two support bars (the left-spiral support bar 131 and the right-spiral support bar 132), the support device 13 is enabled to produce a large radial thrust with a smaller torque, and a radial thrust pushes the two circular arc sections 11 to move in opposite radial directions, so as to adjust the support device 13 to change the diameter of the above circular ring, thus forcing the circular arc sections 11 to "closely contact" with the flexible heat source 12. When the difference between the inner diameter of the fixed shaft 22 and the diameter of the above circular ring is less than or equal to the thickness of the two flexible heat sources 12, it indicates that the flexible heat source 12 has been pressed between the circular ring and the inner wall of the fixed shaft 22, and the close contact of the flexible heat source 12 with the inner wall of the fixed shaft 22 of the wind power generator 2 is achieved. In addition, the heating device according to the embodiment of the present application has fully taken into account the issue that the space in a fixed shaft chamber is small (generally only one worker can be accommodated to access). By providing the bi-directional-spiral sleeve mechanism and cooperating with the force applying bar, the assembly and disassembly and maintenance can be performed conveniently, and the force applying bar can be operated fully by one hand, thus facilitating the worker's performing the maintenance.

Figure 4:
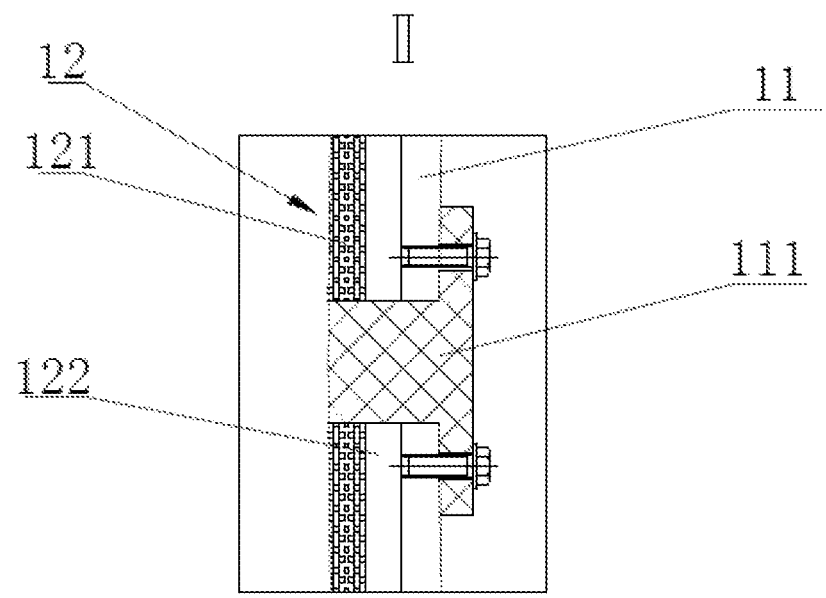
FIG. 4 is a partial enlarged view of the structure in FIG. 3 at a part II.

As shown in FIG. 4, FIG. 4 is a partial enlarged view of the structure in FIG. 3 at a part II. In order to provide a stable pressing force to the flexible heat source 12, this embodiment of the present application may further include an abutting arc section 111. The abutting arc section 111 may be arranged at a junction of adjacent circular arc sections 11 (the circular arc sections 11 in the same group) in the circumferential direction and fixedly connected to the circular arc sections 11 at the two sides. Thus, the pressing forces applied by the circular arc section 11 to various positions of the flexible heat source 12 can be uniform.

In the above structure, the abutting arc section 111 may be in a "T" shape, and a vertical strip of the "T" shape (an end of the vertical strip) may directly abut against the inner wall of the fixed shaft 22 (i.e., there is no flexible heat source at the abutting arc section 111), the side walls of the adjacent circular arc sections 11 may abut against the side walls of the vertical strip of the T shape, and a transverse strip of the "T" shape may be fixedly connected to inner surfaces of the adjacent circular arc sections 11.

In the above heating devices, a horizontally rotating the force applying bar 134 may drive the bi-directional-spiral sleeve 133 to rotate, which allows the two support bars to extend or retract and the inner diameter of the circle formed by the two circular arc sections 11 is increased by means of the "force transmission screw" structure. When the two support bars are extended, as the inner diameter of the above-mentioned circle increases, it begins to present a gap at the junction of the two circular arc sections 11, and till the gap increases to the extent that two abutting arc sections 111 (the abutting arc section 111 has a length of 15 mm) can be embedded at the junctions of the two arc sections 11, the two abutting arc sections 111 are embedded, and then rotating the force applying bar 134 is stopped. By such an operation, the gap is gradually increased to a proper degree (e.g., 15 mm), and the degree of pressing of the two circular arc sections 11 with respect to the two abutting arc sections 111 reaches a proper extent, thus achieving the "close contact" of the two abutting arc sections 111 with the two adjacent circular arc sections 11. The degree of compression of the flexible heat source 12 by the two circular arc sections 11 is further adjusted to allow the flexible heat source 12 to "closely contact" with the two circular arc sections 11, and then the abutting arc sections 111 are further respectively connected to the two arc sections (in FIG. 4, bolt connection is employed) to form a "complete circular ring". After the abutting arc sections 111 are respectively connected to the two arc sections 11, a reverse radial action force to the support device 13 is generated. This also addresses the loosening issue occurred in the connection between the bi-directional-spiral sleeve 133 and the two support bars, and meets the anti-loosening requirement. After a "complete circular ring" is formed, it may ensure that the pressures of a group of circular arc sections 11 against the flexible heat source 12 in the radial direction is consistent (i.e., the "close contact" has a consistent extent), thereby enabling the extent of the "close contact" of the flexible heat source 12 with the inner wall of the fixed shaft 22 of the wind power generator 2 to be consistent. It is necessary to ensure the "close contact" between the flexible heat source 12 and the fixed shaft 22 of the wind power generator 2, otherwise, the flexible heat source 12 may have its temperature risen to tens of degrees within a few minutes due to its small heat capacity. The flexible heat source 12 itself has no "self-balancing capability", and if there is no heat storage body with a high thermal body to absorb heat, the flexible heat source 12 itself will be burned, failure, and even cause a fire.

Figure 5:
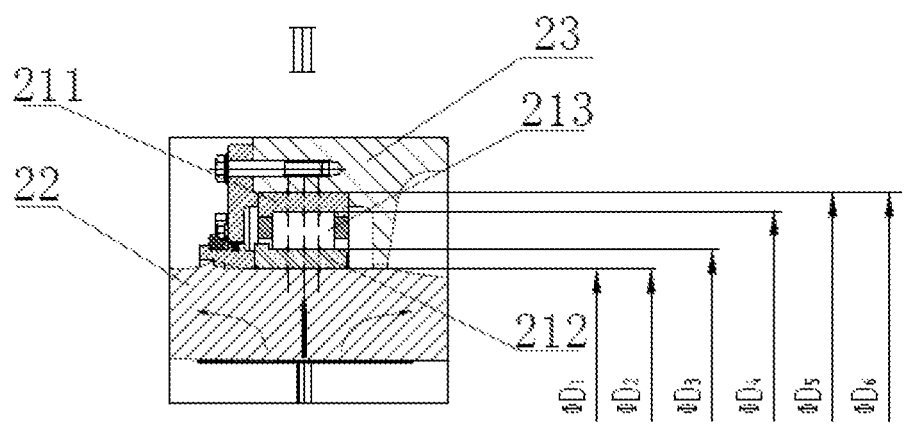
FIG. 5 is a schematic diagram of heat transfer according to an embodiment of the present application.

As shown in FIG. 5, it is a schematic diagram of the heat transfer of this embodiment of the present application (the schematic view is with respect for the rear bearing). In the drawing, ΦD1 toΦD5 represent the following meanings respectively: ΦD1: an outer diameter of the fixed shaft 22; ΦD2: an inner diameter of a bearing inner ring; ΦD3: an outer diameter of the bearing inner ring; ΦD4: an inner diameter of a bearing outer ring; ΦD5: an outer diameter of the bearing outer ring, ΦD6: an inner diameter of the rotatable shaft 23. After the flexible heat source 12 is supported by the combination of the support device 13 and the circular arc sections 11, the flexible heat source 12 is in "close contact" with the inner wall of the fixed shaft 22 of the wind power generator 2, and upward arrows in the fixed shaft 22 in FIG. 5 indicate the paths for transferring heat by the flexible heat source 12, downward and upward arrows in the roller 213 indicate flow paths of the heat generated by the rotation of the bearing 21, downward arrows in the bearing outer ring 211 indicate the flow path of the heat generated by the rotation of the rotatable shaft 23. The heat radiated by the flexible heat source 12 passes through the cylinder wall of the fixed shaft 22, thus a part of the heat is distributed to the natural environment in an axial direction of the fixed shaft 22, and another part of the heat is partially transferred to the bearing inner ring 212 in the radial direction of the fixed shaft 22. The heat generated by the rotation of the bearing 21 and the heat of the flexible heat source 12 meet at the interior of the bearing inner ring 212. The heat generated by the rotation of the bearing 21 and the heat generated by the rotation of the rotatable shaft 23 meet at the interior of the bearing outer ring 211. The flexible heat source 12 provides the bearing 21 with heat source, such that the bearing lubricating grease will not be frozen and can maintain the lubrication grease to be fluidized, thus prolonging the service life of the bearing 21, and ensuring that the lubrication grease to have an lubrication effect.

In addition, the flexible heat source 12 may include a flame retardant flexible electric heat source layer 121 and an electrically insulating elastic layer 122. The flame retardant flexible electric heat source layer 121 may adhere to and fit the inner wall of the fixed shaft 22 and the electrically insulating elastic layer 122 may be arranged between the flame retardant flexible electric heat source layer 121 and the outer surfaces of the circular arc sections 11. The flame retardant flexible electric heat source layer 121 may have a thickness ranging from 1.5 mm to 2 mm, and the interior of the flame retardant flexible heat source layer 121 may be provided with a Pt100 sensor type temperature-sensing element. A lead wire of the sensor may be connected to the nacelle control cabinet in order to perform process monitor control to the flame retardant flexible electric heat source layer 121. The flame retardant flexible heat source layer 121 may be a silicone rubber heating pad (containing a flame retardant component). The electrically insulating elastic layer 122 may be a methyl-vinyl silicone rubber pad having a thickness of not less than 8 mm to 10 mm, and the methyl-vinyl silicone rubber pad is a heat-resistant elastic material having a large amount of deformation, and has properties of excellent resilience and small permanent deformation. The methyl-vinyl silicone rubber pad will generate a large amount of deformation (20% to 25% of the base material thickness may just meet the requirements), which may compensate for insufficient of the circular degree and smoothness of the inner cavity surface of the fixed shaft 22 (the fixed shaft 22 is made of a casting material, and during the casting process, the circular degree and smoothness of the surface surrounded by the mold is less than 0.5 mm to 1 mm). In addition, the flexible heat source 12 and the electrically insulating elastic layer 122 may be bonded and fixed with a polyimide double sided adhesive tape. The electrically insulating elastic layer 122 can be used as a heat insulating layer for preventing the heat of the flexible heat source 12 from transferring from one end of the circular arc section 11 and further reducing the power consumption of the flexible heat source 12. The pressure applied by the support device 13 to the heat insulating layer on a cavity side of the flexible heat source 12 is adjustable to accommodate the permanent deformation of the material. Further, a layer of insulating refractory material may be added between the elastic material such as the methyl-vinyl silicone rubber pad and the circular arc sections 11, for example, a glass wool felt enclosed by a fireproof cloth.

In addition, in order to avoid the safety hazard caused by failure of the support device 13, a pressure sensor may be provided in the abutting arc section 111 and configured to measure the pressure of the flexible heat source 12. When the abutting arc section 111 loses pressure, the pressure sensor transmits a signal to a corresponding control system, and the control system sends out an alarm signal, and the control system cuts off the power supply system of the flexible heat source 12 through corresponding control, thus, catching fire, electric leakage and so on is avoided in a real time. Specifically, a sensitive pressure measuring element (pressure sensor) may be provided on the surface and the interior of the abutting arc section 111, thus, "failure of contact" of the flexible heat source 12 with the abutting arc 111 (contact surface separation) is avoided. In the above device, two circular arc sections 11 are abutted by means of the abutting arc section 111 containing a pressure sensor therein, and when the pressure sensor measures that the pressure of a group of circular arc sections 11 is less than a normal value, an alarming signal is sent out and the power supply is cut off, thereby achieving the measurement of the close degree of the abutting between the flexible heat source 12 and the inner wall of the fixed shaft 22, addressing the loosening issue of the support device 13, the circular arc section 11, the abutting arc section 111, and the flexible heat source 12.

Second Embodiment

As shown in FIG. 1, this embodiment relates to a bearing system for a wind power generator, which mainly includes a main shaft of a wind power generator and a blade side bearing 21a and a tower side bearing 21b sleeved on the main shaft. The heating device 1 described in the first embodiment is provided inside the main shaft at a position corresponding to the blade side bearing 21a and/or the tower side bearing 21b.

Further, the above wind power generator may have a structure with an outer rotor and an inner stator, and in this case, the main shaft is a fixed shaft of the wind power generator, and a rotatable shaft of the wind power generator is sleeved outside of the fixed shaft by the tower side bearing and the blade side bearing.

As a further modification, the wind power generator may also employ a structure with an outer stator and an inner rotor, and in this case, the above main shaft is a rotatable shaft of the wind power generator, and a fixed shaft of the wind power generator is sleeved outside of the movable shaft by the tower side bearing and the blade side bearing.

In this embodiment, the heating device 1 according to the first embodiment is provided in the bearing system of the wind power generator including the main shaft and the bearing, and the blade side bearing 21a and/or the tower side bearing 21b sleeved outside of the main shaft can be heated from the inside of the main shaft, such that the bearing lubricating grease will not be frozen and the lubrication grease can be maintained to be fluidized, thereby prolonging the service life of the bearing, and achieving close contact between the flexible heat source and the inner wall of the main shaft of the wind power generator.

Only embodiments of the present application are described hereinbefore, and the scope of the present application is not limited thereto. Any variations or substitutions readily conceived by the person skilled in the art within the technical scope disclosed in the present application should be covered in the scope of the present application. Therefore, the scope of the present application should be construed with the scope defined by the claims.

The invention claimed is:

1. A heating device for protecting a bearing of a wind power generator, wherein the heating device is applied to a main shaft of a wind power generator with a bearing sleeved on the main shaft, the heating device is arranged inside the main shaft at a position corresponding to the bearing, and the heating device comprises:
   a plurality of circular arc sections,
   a flexible heat source arranged between an inner wall of the main shaft and the plurality of circular arc sections, and
   a support device configured to support inner surfaces of the plurality of circular arc section for closely fitting the flexible heat source against the inner wall of the main shaft.

2. The heating device for protecting the bearing of the wind power generator according to claim 1, wherein
   each of the plurality of circular arc sections have the same size and the number of the plurality of circular arc sections is an even number, each two radially opposed circular arc sections form a group, the support device comprises a plurality of groups of left-spiral support bars, right-spiral support bars and bi-directional-spiral sleeves, with the number of the groups the same as the number of groups of the circular arc sections, two ends of a bi-directional-spiral sleeve are respectively connected to an end of a corresponding left-spiral support bar and an end of a corresponding right-spiral support bar, and another end of the left-spiral support bar and another end of the right-spiral support bar are respectively supported in the middle of inner surfaces of the two circular arc sections in the same group.

3. The heating device for protecting the bearing of the wind power generator according to claim 2, wherein a force applying bar for rotating the bi-directional-spiral sleeve is provided in the middle of the bi-directional-spiral sleeve.

4. The heating device for protecting the bearing of the wind power generator according to claim 2, wherein a pressure sensor is provided in the abutting arc section for measuring the pressure of the flexible heat source.

5. The heating device for protecting the bearing of the wind power generator according to claim 1, further comprising:
   an abutting arc section arranged at a junction of adjacent circular arc sections in a circumferential direction and fixedly connected to the circular arc sections at two sides.

6. The heating device for protecting the bearing of the wind power generator according to claim 5, wherein the abutting arc section is in a "T" shape, and a vertical strip of the "T" shape abuts against the inner wall of the main shaft, and side walls of adjacent circular arc sections abut against side walls of the vertical strip of the "T" shape, and a transverse strip of the "T" shape is fixedly connected to inner surfaces of the adjacent circular arc sections.

7. The heating device for protecting the bearing of the wind power generator according to claim 1, wherein the flexible heat source comprises:
   a flame retardant flexible electric heating source layer, and
   an electrically insulating elastic layer,
   wherein the flame retardant flexible electric heating source layer adheres to and fits the inner wall of the main shaft; and
   the electrically insulating elastic layer is arranged between the flame retardant flexible electric heating source layer and outer surfaces of the plurality of circular arc sections.

8. The heating device for protecting the bearing of the wind power generator according to claim 7, wherein the flame retardant flexible electric heating source layer is a silicone rubber heating pad.

9. The heating device for protecting the bearing of the wind power generator according to claim 1, wherein the circular arc section is made of a rigid material.

10. The heating device for protecting the bearing of the wind power generator according to claim 1, wherein the number of circular arc sections is two, and the circular arc section is a semicircular arc section.

11. The heating device for protecting the bearing of the wind power generator according to claim 1, wherein the wind power generator is a structure with an outer rotor and an inner stator, and the main shaft is a fixed shaft of the wind power generator.

12. The heating device for protecting the bearing of the wind power generator according to claim 1, wherein the wind power generator is a structure with an outer stator and an inner rotor, and the main shaft is a rotatable shaft of the wind power generator.

13. The heating device for protecting the bearing of the wind power generator according to claim 1, wherein the heating device is arranged at a position corresponding to each of a tower barrel side bearing and a paddle side bearing, or
   the heating device is arranged at a position corresponding to the tower barrel side bearing or the paddle side bearing.

14. A bearing system of a wind power generator, comprising:
   a main shaft of the wind power generator, and
   a paddle side bearing and a tower barrel side bearing sleeved on the main shaft,
   wherein the heating device for protecting a bearing of the wind power generator according to claim 1 is provided inside the main shaft at a position corresponding to each of the paddle side bearing and the tower barrel side bearing, or
   the heating device for protecting a bearing of the wind power generator according to claim 1 is provided inside the main shaft at a position corresponding to the paddle side bearing or the tower barrel side bearing.

15. The bearing system of the wind power generator according to claim 14, wherein the wind power generator is a structure with an outer rotor and an inner stator, the main shaft is a fixed shaft of the wind power generator, and a rotatable shaft of the wind power generator is sleeved outside the fixed shaft by the paddle side bearing and the tower barrel side bearing.

16. The bearing system of the wind power generator according to claim 14, wherein the wind power generator is a structure with an outer stator and an inner rotor, the main shaft is a rotatable shaft of the wind power generator, and a fixed shaft of the wind power generator is sleeved outside the rotatable shaft by the paddle side bearing and the tower barrel side bearing.

* * * * *